(12) United States Patent
Suzaki

(10) Patent No.: US 6,775,275 B2
(45) Date of Patent: Aug. 10, 2004

(54) MATRIX SWITCH METHOD AND DEVICE

(75) Inventor: Tetsuyuki Suzaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/198,267

(22) Filed: Nov. 24, 1998

(65) Prior Publication Data
US 2003/0137977 A1 Jul. 24, 2003

(30) Foreign Application Priority Data
Nov. 25, 1997 (JP) .............................................. 9-323504

(51) Int. Cl.[7] .............................................. H04Q 11/00
(52) U.S. Cl. ...................................... 370/367; 370/387
(58) Field of Search ................................ 370/503, 509, 370/510, 511, 512, 513, 514, 515, 516, 517, 518, 519, 367, 387, 522; 375/359, 362, 371, 373, 375, 376; 327/141, 147, 149, 150, 153, 154, 156

(56) References Cited

U.S. PATENT DOCUMENTS

| 5,081,655 | A | * | 1/1992 | Long ............................ 327/231 |
| 5,099,234 | A | * | 3/1992 | Kraker et al. ................. 340/2.2 |
| 5,297,173 | A | * | 3/1994 | Hikmet et al. ................. 331/11 |
| 5,448,192 | A | * | 9/1995 | Van De Wiel ............... 327/141 |
| 5,719,862 | A | * | 2/1998 | Lee et al. ..................... 370/355 |
| 5,784,357 | A | * | 7/1998 | Wolker et al. ............... 370/218 |
| 5,796,795 | A | * | 8/1998 | Mussman et al. ........... 327/153 |

FOREIGN PATENT DOCUMENTS

| JP | 63-30093 | 2/1988 |
| JP | 2-179046 A | 7/1990 |
| JP | 63-131437 U | 8/1998 |

OTHER PUBLICATIONS

"1 Gbit/s, 32×32 High –Speed Space–Division Switching Module For Broadband ISDN Using SST LSIS", IEEE Electronics Letters, vol. 25, No. 13, pp. 831–833.

* cited by examiner

Primary Examiner—Kwang Bin Yao
Assistant Examiner—Keith M. George
(74) Attorney, Agent, or Firm—Sughrue Mion, PLLC

(57) ABSTRACT

In a matrix switch method, pieces of timing information synchronous with the signal speeds of input data parallelly input to N (N is a positive integer) input terminals are extracted. The respective input data are switched/output to N output terminals through a switch. Output signals from the output terminals of the switch are regenerated by using the pieces of timing information extracted from the corresponding input data. A matrix switch device is also disclosed.

8 Claims, 9 Drawing Sheets

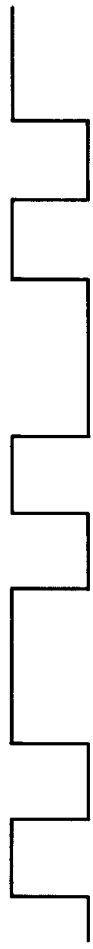
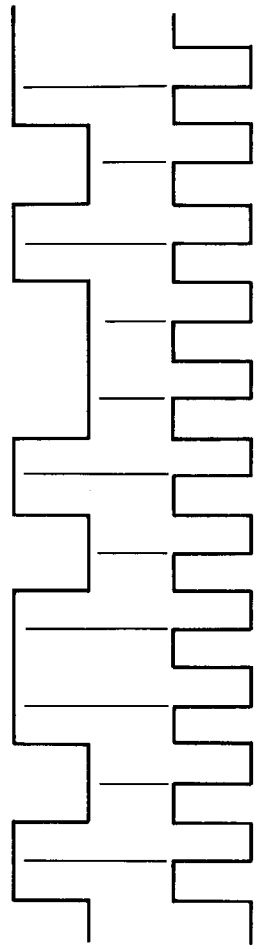
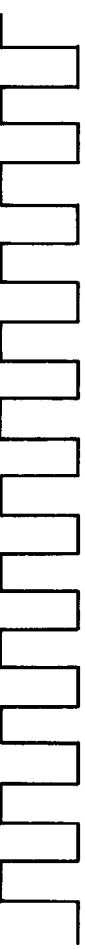
FIG. 3A  INPUT DETA 41
FIG. 3B  CLOCK SIGNAL 11C
FIG. 3C  INPUT DATA 4N
FIG. 3D  CLOCK SIGNAL 1NC
FIG. 3E  OUTPUT SIGNAL 2MD
FIG. 3F  CLOCK SIGNAL 2MC

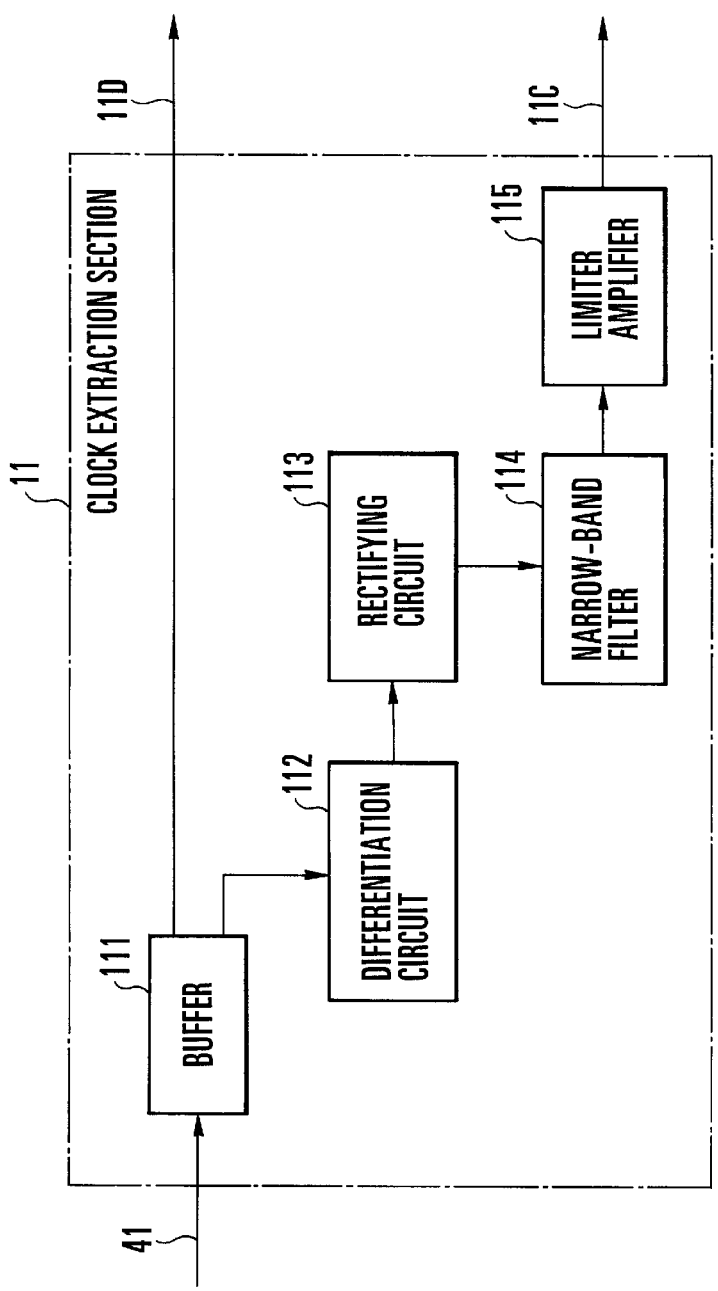
F I G. 4

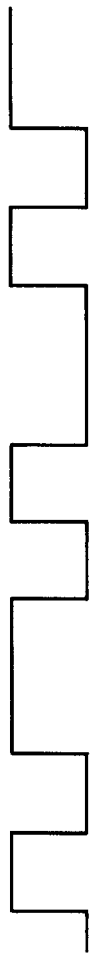
FIG. 5A  INPUT 41
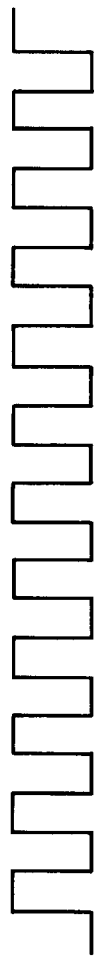
FIG. 5B  CLOCK SIGNAL 11C
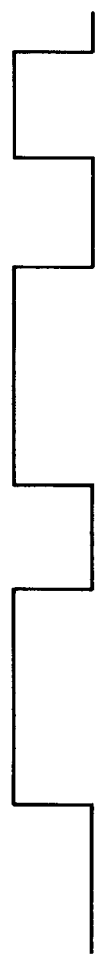
FIG. 5C  INPUT DATA 4N
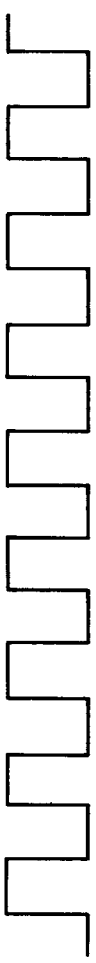
FIG. 5D  CLOCK SIGNAL 1NC
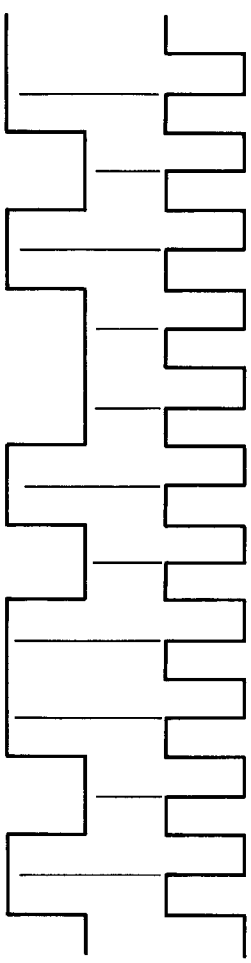
FIG. 5E  OUTPUT SIGNAL 2MD
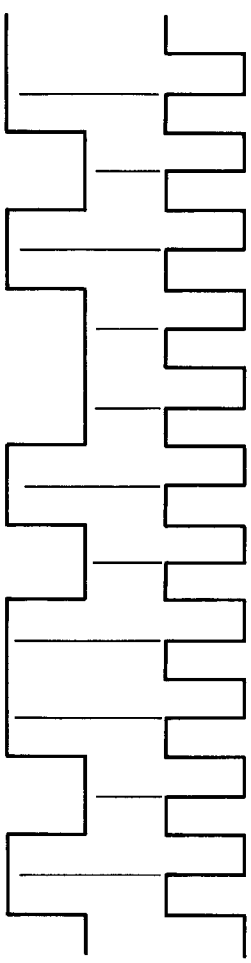
FIG. 5F  CLOCK SIGNAL 2MC

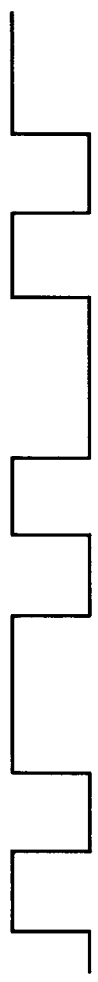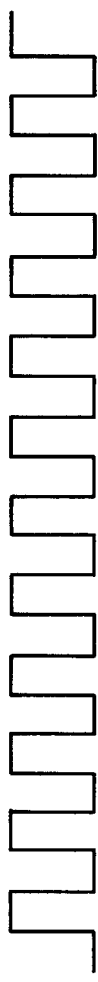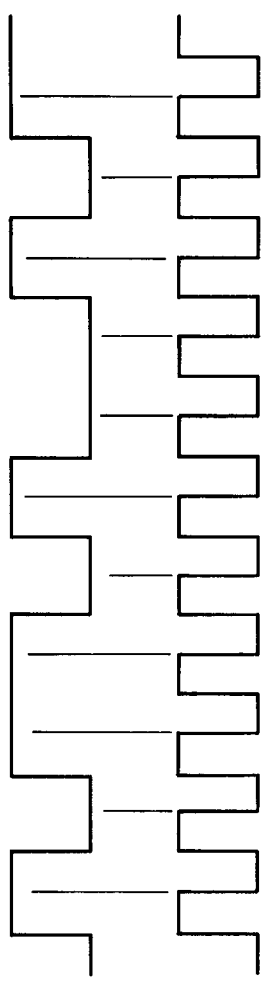
FIG. 8A INPUT DATA 41
FIG. 8B REFERENCE CLOCK 8C
FIG. 8C PHASE DIFFERENCE SIGNAL 61P
FIG. 8D PHASE DIFFERENCE SIGNAL 7MP
FIG. 8E OUTPUT SIGNAL 2MD
FIG. 8F CLOCK SIGNAL 2MC

6,775,275 B2

MATRIX SWITCH METHOD AND DEVICE

BACKGROUND OF THE INVENTION

The present invention relates to a matrix switch method and device and, more particularly, to a high-speed data matrix switch method and device which are used for a switch unit or cross-connect apparatus in large-capacity communication.

In a future switch unit or cross-connect apparatus used for large-capacity communication, it is expected that switching of large-capacity data on the several 10 Gbit/s order will be required. In this case, a matrix switch device used for these apparatuses is required to have the function of switching high-speed data with a signal speed of several Gbit/s at each input/output terminal. A significant challenge for such an apparatus is to suppress a deterioration in the waveform of high-speed data, and more specifically, time jitter, in the matrix switch device.

Such a high-speed matrix switch device has recently been under development. For example, a technique associated with a space-division matrix switch is disclosed in "1 Gbit/s, 32×32 HIGH-SPEED SPACE-DIVISION SWITCHING MODULE FOR BROADBAND ISDN USING SST LSIs", IEE ELECTRONICS LETTERS, Vol. 25, No. 13, pp. 831–833, June 1989.

FIG. 9 shows a conventional matrix switch device.

Referring to FIG. 9, eight input data are input to a latch 91. The eight signals are then input from the latch 91 to an 8×8 matrix switch 92. The 8×8 matrix switch 92 is made up of eight 8:1 switches 93 connected in parallel. The eight output signals from the matrix switch 92 are input to a latch 94. External clock signals 95 are input to the latch 91 through a variable delay circuit 97, and clock signals 96 are input to the latch 94.

The operation of the conventional matrix switch device having the above arrangement will be described next.

All the eight input data are regenerated and reshaped by the clock signals 95 having the same frequency and phase and the latch 91. Since the input data greatly deteriorate in waveform after passing through the 8×8 matrix switch 92, the data are reshaped again by the latch 94 using the clocks signals 96 having the same frequency as that of the clock signals 95.

This conventional device properly operates with a time jitter amount of 80 ps or less up to 2.2 Gbit/s input data.

In this conventional matrix switch device, if the input data are not synchronized with each other, the signal time phase difference between the respective input data becomes indefinite. In such a case, since waveform shaping cannot be performed by the first latch 91 even by adjusting the clock signals 95, wave-shaping in the first and second latches 91 and 94 cannot be performed.

Consequently, a considerable deterioration in waveform occurs in the matrix switch device, and the device cannot be applied to high-speed data switching.

SUMMARY OF THE INVENTION

It is an object of the present invention to provide a matrix switch method and apparatus which can perform high-speed switching processing for a plurality of parallel input data.

In order to achieve the above object, according to the present invention, there is provided a matrix switch method comprising the steps of extracting pieces of timing information synchronous with signal speeds of input data parallelly input to N (N is a positive integer) input terminals, switching and outputting the respective input data to N output terminals through a switch, and regenerating output signals from output terminals of the switch by using the pieces of timing information extracted from the corresponding input data.

BRIEF DESCRIPTION OF THE DRAWINGS

FIGS. 3A to 3F are timing charts showing the operation of the matrix switch shown in FIGS. 1 and 2;

FIG. 4 is a block diagram showing a clock extraction section according to the second embodiment of the present invention;

FIGS. 5A to 5F are timing charts showing the operation of the matrix switch shown in FIGS. 1 and 4;

FIGS. 8A to 8F are timing charts showing the operation of the matrix switch shown in FIGS. 6 and 7.

DESCRIPTION OF THE PREFERRED EMBODIMENTS

The present invention will be described next with reference to the accompanying drawings.

Figure 1:
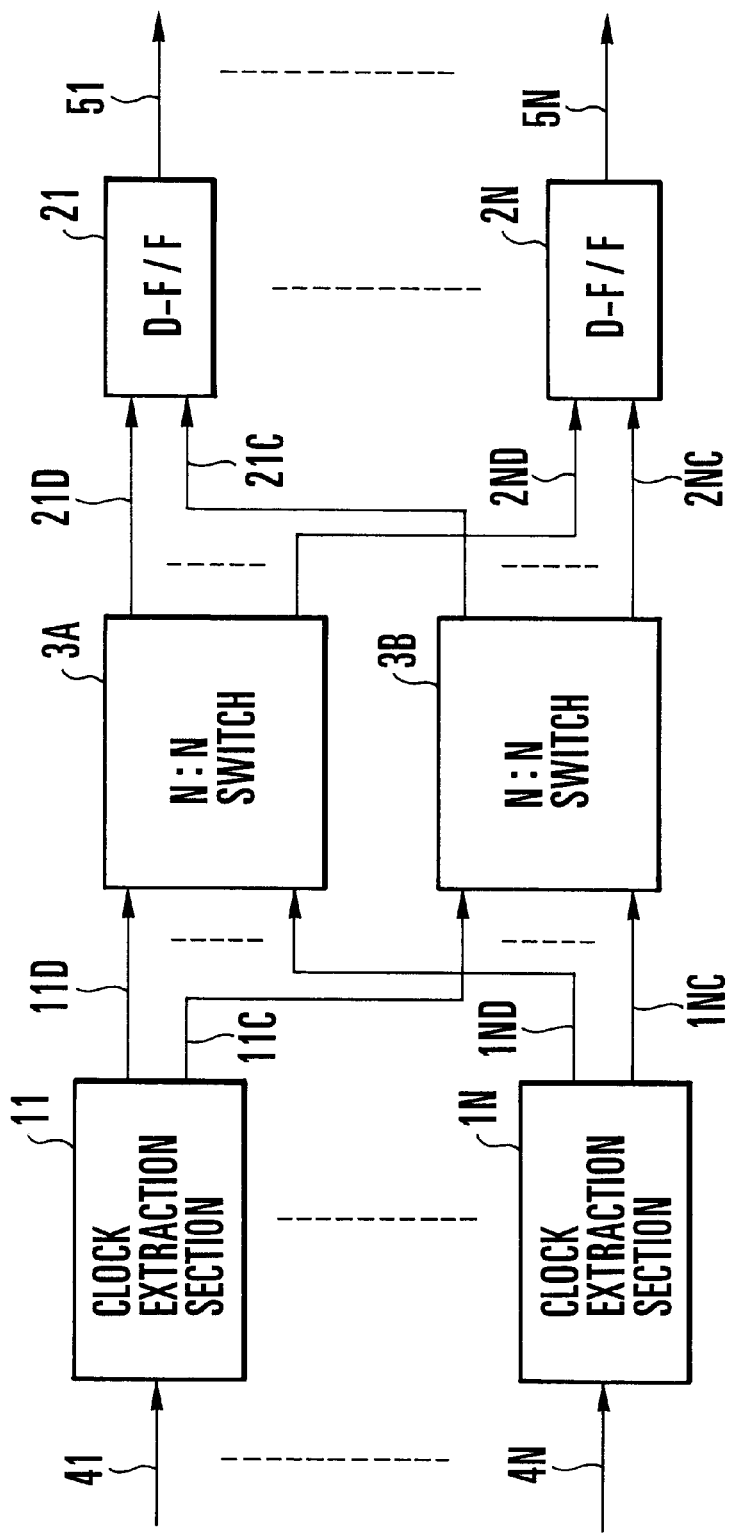
FIG. 1 is a block diagram showing a matrix switch device according to the first embodiment of the present invention.

FIG. 1 shows a matrix switch device according to the first embodiment of the present invention. Referring to FIG. 1, input data 41 to 4N that are parallelly input from a plurality of input terminals and are asynchronous with each other are respectively input to clock extraction sections (timing information extraction means) 11 to 1N. The clock extraction sections 11 to 1N extract clock signals 11C to 1NC synchronous with the transmission rate of the input data, and output data signals 11D to 1ND equivalent to the input data.

The data signals 11D to 1ND from the clock extraction sections 11 to 1N are respectively input to the N input terminals of an N:N switch (first switch means) 3A. The clock signals 11C to 1NC from the clock extraction sections 11 to 1N are respectively input to the N input terminals of an N:N switch (second switch means) 3B.

Signals from the N output terminals of the N N switch 3A are output as output signal 21D to 2ND to D flip-flops (D-F/F: timing regeneration means) 21 to 2N. Signals from the N output terminals of the N:N switch 3B are output as clock signals 21C to 2NC to the D flip-flops 21 to 2N.

The D flip-flops 21 to 2N regenerates the waveforms of the output signals 21D to 2ND, i.e., regenerates them, at the timings (waveform end points) of the clock signals 21C to 2NC extracted from the input data 41 to 4N as the sources of the output signal 21D to 2ND, thereby outputting the resultant data as output data 51 to 5N from the respective output terminals.

Figure 2:
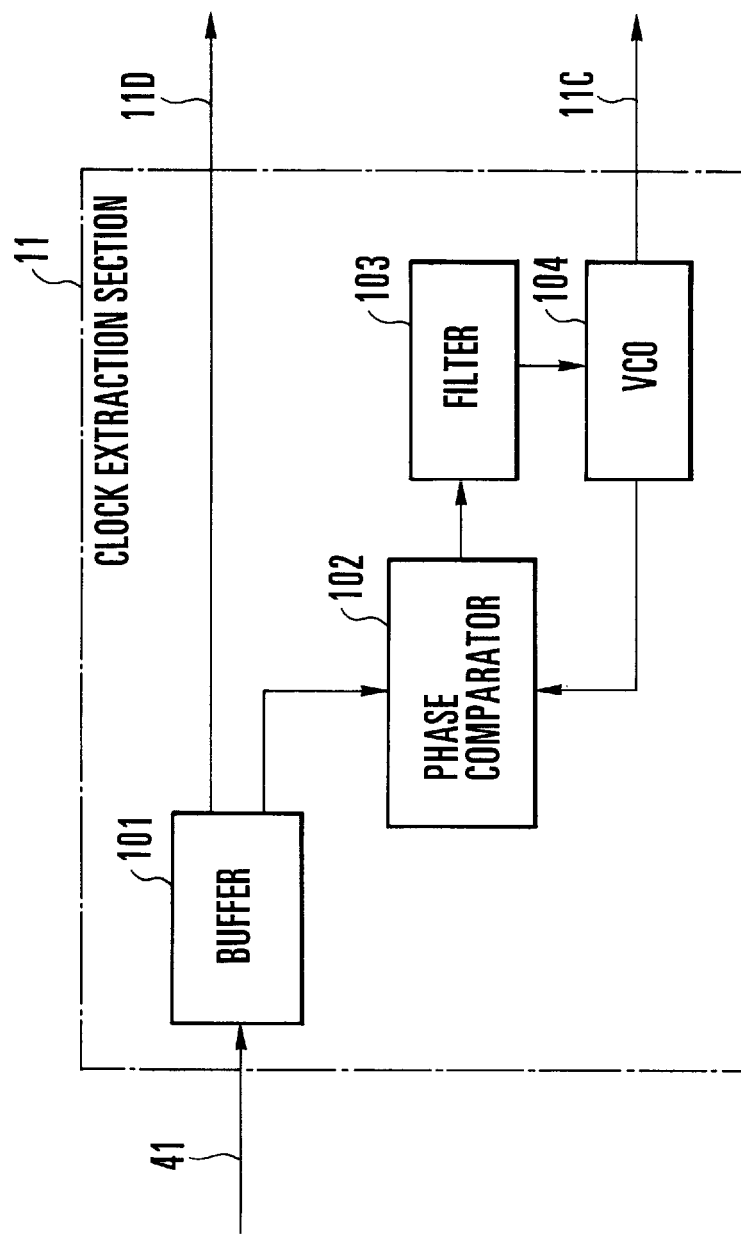
FIG. 2 is a block diagram showing a clock extraction section in FIG. 1.

FIG. 2 shows each of the clock extraction sections 11 to 1N in FIG. 1. Since all the clock extraction sections have the same arrangement, the clock extraction section 11 will be exemplified.

Referring to FIG. 2, the clock extraction section 11 is constituted by a buffer 101, a phase comparator 102, a filter 103, a VCO (Voltage Controlled Oscillator) 104. The input data 41 is branched into two data by the buffer 101. One data is output as the data signal 1D, and the other data is output to the phase comparator 102. An output from the phase comparator 102 is output to the VCO 104 through the filter 103.

An output signal from the VCO 104 is branched into two signals. One signal is output as the clock signal 11C, and the other signal is output to the phase comparator 102. The oscillation frequency of the VCO 104 is variable within a clock signal frequency change range in which the frequency changes in accordance with the transmission rate of the input data 41. The phase comparator 102 detects the phase difference between the input data 41 received through the buffer 101 and the output signal from the VCO 104, and outputs phase difference information to the filter 103.

The phase difference information from the phase comparator 102 is input to the VCO 104 after unnecessary high-frequency components are removed from the information by the filter 103. The frequency oscillation frequency of the VCO 104 is adjusted such that the phase difference information is minimized, i.e., the phase difference between the input data 41 and the output from the VCO 104 is minimized. With this operation, the clock signal 11C corresponding to the transmission rate of the input data 41 can be obtained.

FIGS. 3A to 3F show the operation of the matrix switch device shown in FIGS. 1 and 2. Assume that the input data 41 and 4N are respectively input to the clock extraction sections 11 and 1N.

First of all, clock signals 11C and 1NC synchronized with the input data 41 and 4N are obtained by the clock extraction sections 11 and 1N. If the input data 41 and 4N in FIGS. 3A and 3C are not synchronous with each other, the phases of the clock signal 1NC obtained from the clock extraction section 1N and input data 41 do not become stable unlike those shown in FIGS. 3B and 3C. If, therefore, all the input data are not synchronous with each other, the clock signal 11C from the clock extraction section 11 is required to regenerate the input data 41.

When the data signal 11D is output from the clock extraction section 11, the N:N switch 3A performs switching processing, and outputs the resultant signal as the output signal 2MD to a D flip-flop 2M (M is one of 1 to N). At the same time, the N:N switch 3B performs switching processing, and outputs the clock signal 11C from the clock extraction section 11 as the clock signal 2MC to the D flip-flop 2M.

That is, when the N:N switches 3A and 3B perform switching processing under the same input/output relationship, two outputs 1MD and 1MC from a clock extraction section 1M are output to the single D flip-flop 2M.

With this operation, in the D flip-flop 2M, as shown in FIGS. 3E and 3F, the output signal 2MD equivalent to the input data 41 is regenerated at the trailing edge of the clock signal 2MC extracted from the input data 41. As a result, the signal reshaped by the D flip-flop 2M is output as output data 5M to the output terminal.

According to the experiment conducted by the present inventor, in the first embodiment of the present invention, it was confirmed that switching processing for 16 input data having transmission rate ranging from 1.2 to 2.4 Gb/s could be performed while excellent response waveforms were maintained. The jitters in the time axis direction in this case were 30 psec or less.

FIG. 4 shows a clock extraction section according to the second embodiment of the present invention. The overall arrangement of this embodiment is the same as that of the first embodiment shown in FIG. 1 except for the arrangement of each of clock extraction sections 11 to 1N. Since the clock extraction sections 11 to 1N have the same arrangement, the clock extraction section 11 will be exemplified below.

Referring to FIG. 4, the clock extraction section 11 is constituted by a buffer 111, a differentiation circuit 112, a rectifying circuit 113, a narrow-band filter 114, and a limiter amplifier 115. Input data 41 is branched into two data by the buffer 111. One data is output as a data signal 1D, and the other data is output to the differentiation circuit 112.

The waveform of one data of the input data 41 received through the buffer 111 is differentiated by the differentiation circuit 112 and shaped by the rectifying circuit 113. As a result, a clock signal component synchronous with the transmission rate of the input data 41 is generated. The narrow-band filter 114 removes unnecessary frequency components from the output from the rectifying circuit 113 to extract only a clock signal. The output from the narrow-band filter 114 is amplified by the limiter amplifier 115. As a result, a clock signal 11C having a predetermined amplitude and corresponding to the transmission rate of the input data 41 is obtained.

FIGS. 5A to 5F show the operation of the matrix switch device in FIGS. 1 and 4.

As shown in FIGS. 5A and 5C, input data 41 to 4N are not synchronous with each other but have the same transmission rate. Although clock signals 11C and 1NC having the same frequency are obtained from the clock extraction sections 11 and 1N, their phases are not locked with each other, as shown in FIGS. 5B and 5D. Even if, therefore, the phases of the input data 41 and 4N or the clock signals 11C and 1NC are separately adjusted in a fixed manner, since the transmission rates of the input data 41 and 4N have time fluctuations, the input data can be regenerated only with a clock signal extracted from the identical input data.

In this case, as in the first embodiment, an N:N switch 3A performs switching processing to output the data signal 11D from the clock extraction section 11 as an output signal 2MD to a D flip-flop 2M. At the same time, an N:N switch 3B performs switching processing to output the clock signal 11C from the clock extraction section 11 as a clock signal 2MC to the D flip-flop 2M.

With this operation, in the D flip-flop 2M, as shown in FIGS. 5E and 5F, the output signal 2MD equivalent to the input data 41 can be regenerated at the trailing edge of the clock signal 2MC extracted from the input data 41 as a source, and the reshaped signal is output as output data 5M from the output terminal.

In the second embodiment of the present invention, the respective input data need to have the same transmission rate, but clock signals 21C to 2NC to D flip-flops 21 to 2N exhibit small phase fluctuations.

According to the experiment conducted by the present inventor, in this embodiment of the present invention, it was confirmed that switching processing for 16 input data having a transmission rate of 2.4 Gb/s could be performed while the jitters of the respective data in the time axis direction were 10 psec or less, i.e., excellent response waveforms were maintained.

Figure 6:
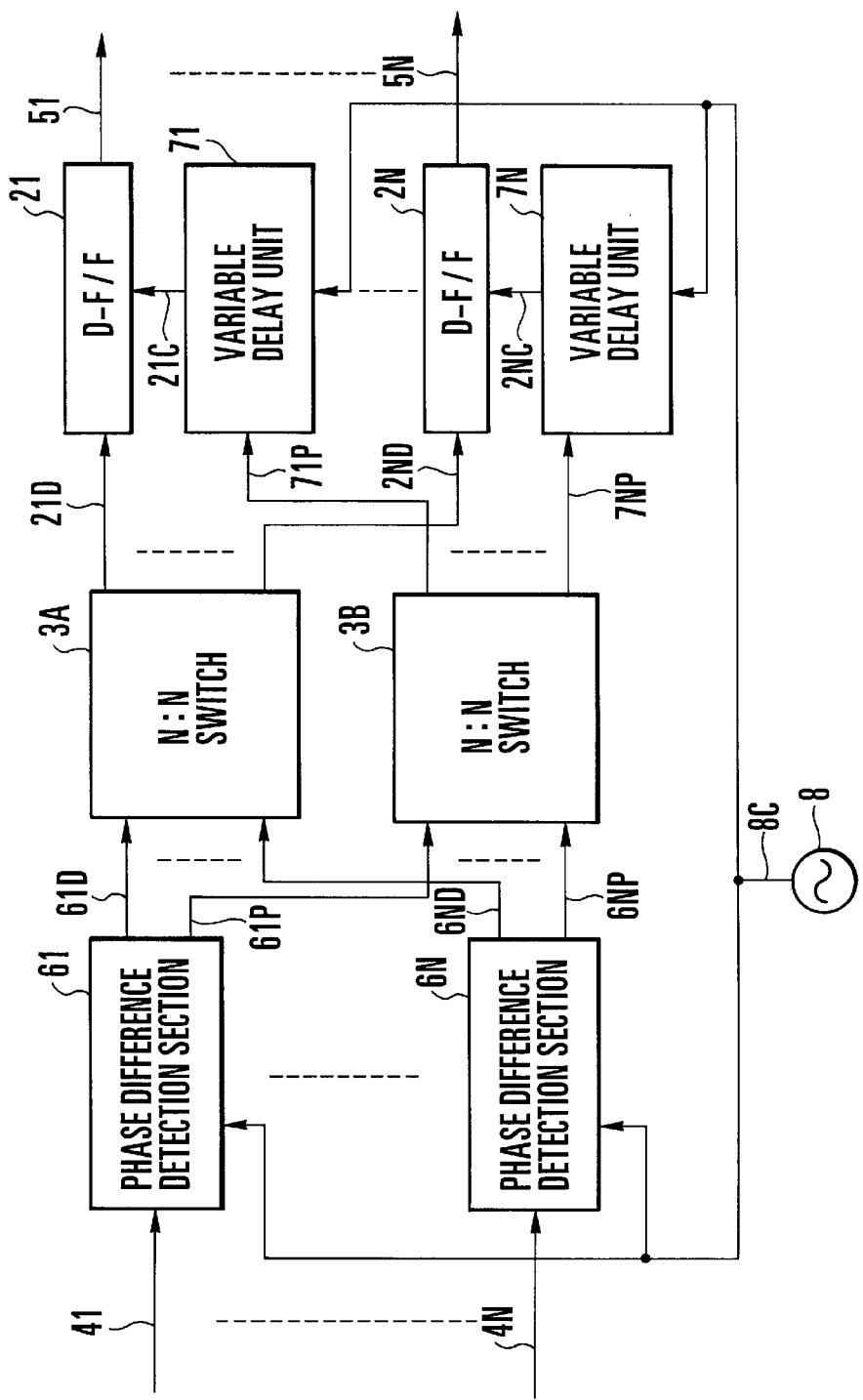
FIG. 6 is a block diagram showing a matrix switch device according to the third embodiment of the present invention.

FIG. 6 shows a matrix switch device according to the third embodiment of the present invention.

Referring to FIG. 6, input data 41 to 4N that are parallelly input from the respective input terminals and are not synchronous with each other are input to phase difference detection sections 61 to 6N. An output from a reference clock generator (reference clock source) 8, i.e., a reference clock 8C, is branched into 2N clocks. Of these clocks, N clocks are output to the phase difference detection sections 61 to 6N.

The phase difference detection sections 61 to 6N respectively output data signals 61D to 6ND equivalent to the input data 41 to 4N, and also output phase difference signals 61P to 6NP indicating the phase differences between the input data 41 to 4N and the reference clock 8C. The data signals 61D to 6ND from the phase difference detection sections 61 to 6N are connected to the N input terminals of an N:N switch 3A. The phase difference signals 61P to 6NP from the phase difference detection sections 61 to 6N are connected to the N input terminals of an N:N switch 3B.

The N:N switch 3A outputs output signals 21D to 2ND from the N output terminals to D flip-flops 21 to 2N. The N:N switch 3B outputs control signals 71P to 7NP from the N output terminals to variable delay units 71 to 7N.

The N reference clocks 8C branched from the reference clock generator 8 are input as clock signals 21C to 2NC to the D flip-flops 21 to 2N through the variable delay units 71 to 7N.

The D flip-flops 21 to 2N regenerate the waveforms of the output signals 21D to 2ND, i.e., regenerate them, at the timings (waveform end points) of the clock signals 21C to 2NC extracted from the input data 41 to 4N, thereby outputting the resultant data as output data 51 to 5N from the respective output terminals.

Figure 7:
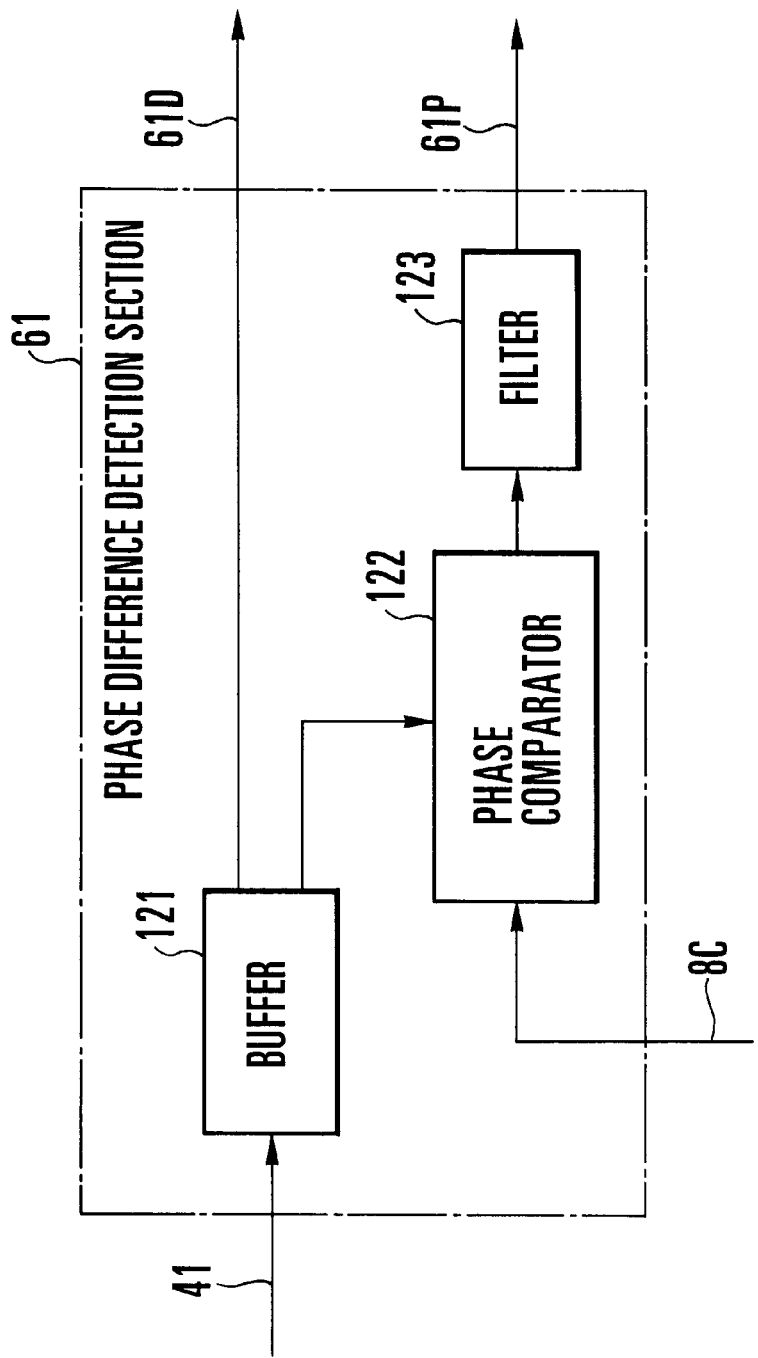
FIG. 7 is a block diagram showing a phase detection section in FIG. 6.
Figure 9:
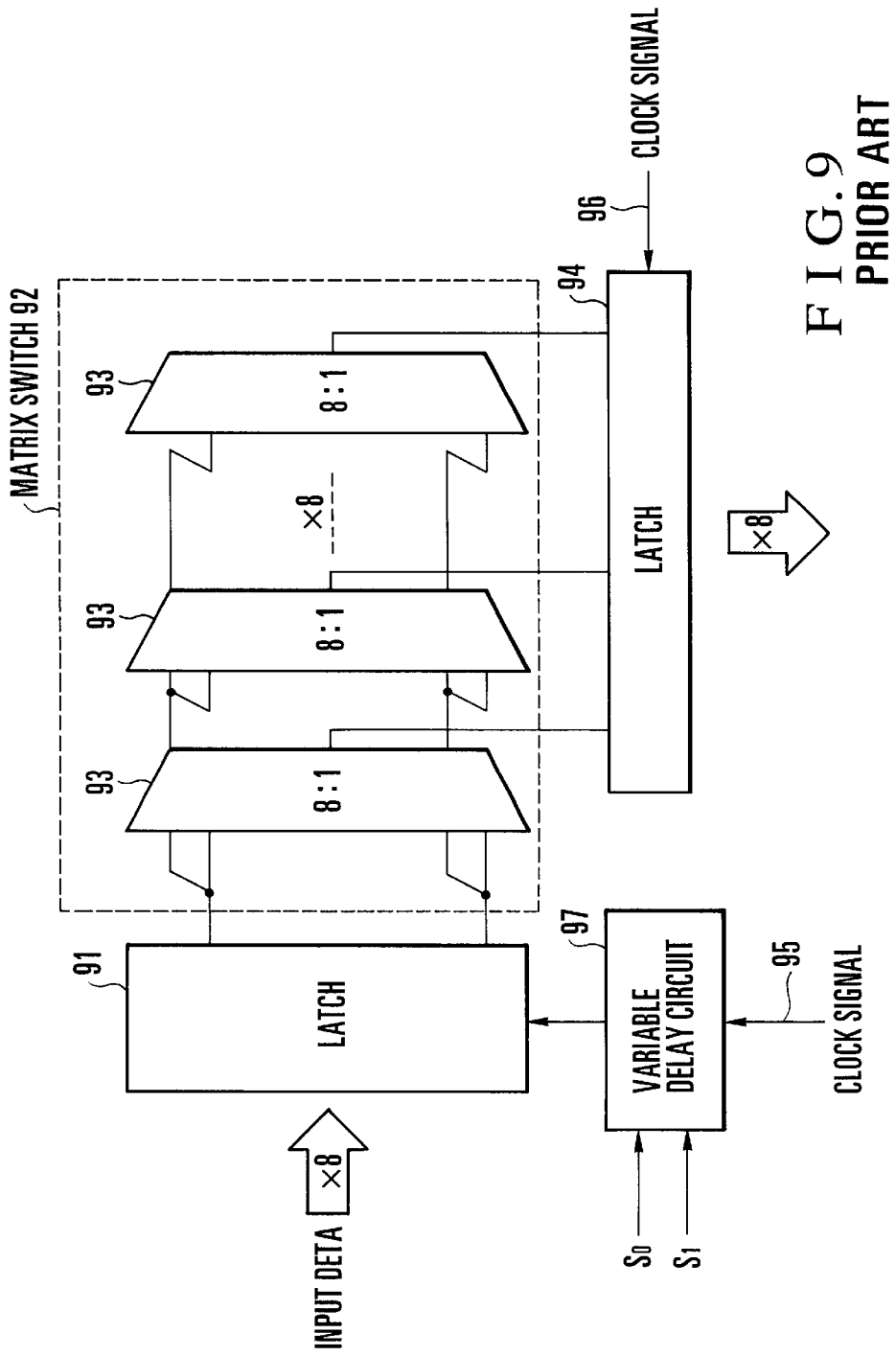
FIG. 9 is a block diagram showing a conventional matrix switch device.

FIG. 7 shows one of the phase difference detection sections. Since the phase difference detection sections 61 to 6N have the same arrangement, the phase difference detection section 61 will be exemplified.

Referring to FIG. 7, the phase difference detection section 61 is constituted by a buffer 121, a phase comparator 122, and a filter 123. The input data 41 is branched into two data by the buffer 121. One data is output as the data signal 61D, and the other data is output to the phase comparator 122. The reference clock 8C is connected to the other input terminal of the phase comparator 122. An output from the phase comparator 122 is converted into a voltage value by the filter 123, and is output as a phase difference signal 61P.

FIGS. 8A to 8F show the operation of the matrix switch device in FIG. 7. Assume that the input data 41 to 4N are not synchronized with each other but have the same transmission rate. Since the input data 41 to 4N are switched by the same operation, the input data 41 will be exemplified.

First of all, the input data 41 (FIG. 8A) and the reference clock 8C (FIG. 8B) from the reference clock generator 8 are input to the phase difference detection section 61. As shown in FIG. 8C, the phase difference signal 61P indicating the phase difference between the two inputs in a voltage value VD is output.

The data signal 61D from the phase difference detection section 61 is output as an output signal 2MD (FIG. 8E) to a D flip-flop 2M through the N:N switch 3A. At the same time, the phase difference signal 61P from the phase difference detection section 61 is output as a control signal 7MP (FIG. 8D) to a variable delay unit 7M through the N:N switch 3B.

In response to this operation, the variable delay unit 7M adjusts the reference clock 8C from the reference clock generator 8 on the basis of the control signal 7MP such that the phase of the clock is optimized with respect to the input data 41. The resultant clock is output as the clock signal 2MC (FIG. 8F) to the D flip-flop 2M.

In the D flip-flop 2M, therefore, as shown in FIGS. 8E and 8F, the output signal 2MD equivalent to the input data 41 can be regenerated at the trailing edge of the clock signal 2MC corresponding to the phase difference information indicated by the phase difference signal 61P extracted from the input data 41, and the reshaped signal is output as the output data 5M from the output terminal.

According to the third embodiment of the present invention, although the transmission rate of the respective input data must be equal to each other, phase fluctuations of the clock signals 21C to 2NC to the D flip-flops 21 to 2N are small, and the size of the device can be greatly reduced.

According to the experiment conducted by the present inventor, in this embodiment of the present invention, it was confirmed that switching processing for 16 input data having a transmission rate of 2.4 Gb/s could be performed while the jitters of the respective data in the time axis direction were 10 psec or less, i.e., excellent response waveforms were maintained. In addition, it was confirmed that the size of the device could be reduced to about ⅔ that of the second embodiment.

The present invention is not limited to the embodiments described above. For example, clock extraction sections having any arrangements can be used as the clock extraction sections 11 to 1N in the second embodiment as long as they can extract the clock signals 11C to 1NC from the input data 41 to 4N.

As the N:N switches 3A and 3B in the present invention, switches having any arrangement can be used.

As a circuit section for performing regeneration of waveforms in the present invention, a circuit having any timing regeneration function using the clock signals 21C to 2NC can be used instead of the D flip-flops 21 to 2N.

Obviously, the matrix switch method of the present invention can be implemented by any device form in which clock information is extracted at each input terminal, and each waveform is regenerated on the basis of clock information extracted from an identical signal at the input terminal after signal switching, instead of the embodiments described above.

As has been described above, according to the present invention, since data signals output from output terminals are always regenerated by using clock signals having phase relationships with input data, high-speed switching processing can be performed for any combinations of input data without any deterioration in waveform. Consequently, an excellent matrix switch device with small time jitters with respect to high-speed transmission signals on the gigabit order can be realized.

What is claimed is:

1. A matrix switch method comprising the steps of:
   extracting pieces of timing information synchronous with signal speeds of input data parallelly input to N (N is a positive integer) input terminals;
   switching and outputting the respective input data to N output terminals through a switch, the switch being part of a switching matrix that is different from a switching matrix for the timing information; and
   regenerating output signals from output terminals of said switch by using the pieces of timing information extracted from the corresponding input data,
   wherein the step of extracting the pieces of timing information further comprises the steps of:
   generating reference clocks having frequencies equal to the transmission rates of the respective input data; and outputting pieces of phase difference information indicating phase differences between the corresponding input data and the reference clocks as the pieces of timing information.

2. A method according to claim 1, wherein the step of extracting the pieces of timing information comprises the step of outputting clock signals having frequencies equal to the transmission rates of the corresponding input data as the pieces of timing information.

3. A method according to claim 1, wherein the step of performing regeneration comprises the steps of:

delaying the reference clocks on the basis of the pieces of output phase difference information; and regenerating the corresponding input data output from said switch by using the delayed reference clocks.

4. A method according to claim 1, further comprising the step of performing switching processing for the pieces of extracted timing information for regeneration of the corresponding input data.

5. A matrix switch device comprising:

N timing information extraction means for extracting pieces of timing information synchronous with signal speeds of input data parallelly input from N (N is a positive integer) input terminals;

N:N switch means for switching and outputting the respective input data to N output terminals, the N:N switch means being part of a switching matrix that is different from a timing information switching matrix; and N timing regeneration means for regenerating output signals from said switch means by using the pieces of timing information of the corresponding input data extracted by said timing information extraction means wherein said timing extraction means comprises N phase difference detection means for generating data signals equivalent to the input data therefrom and also generating phase difference signals indicating phase differences between the input data and the reference clocks, and said timing regeneration means regenerates output signals from output terminals of said switch by using pieces of corresponding phase difference information from said phase difference detection means.

6. A device according to claim 5, wherein said timing information extraction means comprises clock extraction means for extracting data signals equivalent to the input data and clock signals synchronous with signal speeds of the data signals from the input data, and said timing regeneration means regenerates output signals from output terminals of said switch by using the corresponding clock signals from said clock extraction means.

7. A device according to claim 5, wherein said timing regeneration means comprises:

delay means for delaying the reference clocks on the basis of pieces of phase difference information of the corresponding input data input from said phase difference detection means; and timing regeneration units for regenerating the corresponding input data output from said switch by using the delayed reference clocks.

8. A device according to claim 5, wherein said switch means comprises:

a first N:N switch for switching and outputting N input data to N output terminals; and a second N:N switch for outputting N pieces of timing information from said clock extraction means to N output terminals.

\* \* \* \* \*